US012537038B2

United States Patent
Yoo et al.

(10) Patent No.: US 12,537,038 B2
(45) Date of Patent: Jan. 27, 2026

(54) COLUMN ADDRESS GENERATION CIRCUIT AND SEMICONDUCTOR APPARATUS INCLUDING THE COLUMN ADDRESS GENERATION CIRCUIT

(71) Applicant: SK hynix Inc., Icheon-si (KR)

(72) Inventors: Young Seung Yoo, Icheon-si (KR); Ji Seong Mun, Icheon-si (KR); Hyeon Cheon Seol, Icheon-si (KR); Sung Hwa Ok, Icheon-si (KR); Jae Hoon Jung, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 172 days.

(21) Appl. No.: 18/527,702

(22) Filed: Dec. 4, 2023

(65) Prior Publication Data

US 2025/0037748 A1 Jan. 30, 2025

(30) Foreign Application Priority Data

Jul. 25, 2023 (KR) .......................... 10-2023-0096683

(51) Int. Cl.
*G11C 8/18* (2006.01)
(52) U.S. Cl.
CPC ..................................... *G11C 8/18* (2013.01)
(58) Field of Classification Search
CPC .... G11C 8/18; G11C 8/06; G11C 8/10; G11C 11/2253; G11C 13/0023; G11C 16/08; G11C 8/08
See application file for complete search history.

(56) References Cited

U.S. PATENT DOCUMENTS

| 10,629,248 | B2* | 4/2020 | Kim ......................... G11C 8/18 |
| 11,164,613 | B2 | 11/2021 | Vankayala | |
| 2001/0039602 | A1* | 11/2001 | Kanda ..................... G11C 7/222 |
| | | | 711/167 |
| 2009/0040850 | A1* | 2/2009 | Mori ................. G11C 11/40615 |
| | | | 365/230.01 |
| 2014/0286111 | A1* | 9/2014 | Jung ..................... G11C 7/1066 |
| | | | 365/193 |
| 2015/0155861 | A1* | 6/2015 | Lim ........................ H03K 5/135 |
| | | | 327/276 |
| 2019/0279696 | A1* | 9/2019 | Kim ...................... G11C 11/408 |
| 2020/0035275 | A1* | 1/2020 | Yoon ..................... G11C 7/1066 |
| 2021/0193214 | A1* | 6/2021 | Kim .................... G11C 11/4096 |

FOREIGN PATENT DOCUMENTS

KR 100528482 B1 11/2005

* cited by examiner

*Primary Examiner* — Khamdan N. Alrobaie
(74) *Attorney, Agent, or Firm* — WILLIAM PARK AND ASSOCIATES LTD.

(57) ABSTRACT

A column address generation circuit including: a command set conversion section configured to generate column address information on the basis of sector information included in a first command set synchronized with a first clock signal, and to output a second command set from the first command set by replacing information on column address cycles of the first clock signal with the column address information in response to a conversion signal; and a column address output section configured to output a column address on the basis of the second command set.

20 Claims, 6 Drawing Sheets

COLUMN ADDRESS GENERATION CIRCUIT AND SEMICONDUCTOR APPARATUS INCLUDING THE COLUMN ADDRESS GENERATION CIRCUIT

CROSS-REFERENCES TO RELATED APPLICATION

The present application claims priority under 35 U.S.C. § 119(a) to Korean application number 10-2023-0096683, filed on, Jul. 25, 2023, which is incorporated herein by reference in its entirety.

BACKGROUND

1. Technical Field

The present disclosure generally relates to a semiconductor apparatus, and more particularly, to a semiconductor apparatus including a column address generation circuit.

2. Related Art

Electronic devices may include many electronic components, and among the electronic devices, a computer system may include many electronic components made of semiconductors. Among semiconductor apparatuses constituting a computer system, a memory apparatus may store data under the control of an external device.

In order to improve interface performance between the semiconductor apparatus and the external device, a technique may be required to quickly transmit control signals between the external device and the semiconductor apparatus during fewer clock cycles.

SUMMARY

A column address generation circuit in accordance with an embodiment of the present disclosure may include: a command set conversion section configured to generate column address information on the basis of sector information included in a first command set synchronized with a first clock signal, and to output a second command set from the first command set by replacing information on column address cycles of the first clock signal with the column address information in response to a conversion signal; and a column address output section configured to output a column address on the basis of the second command set.

A column address generation circuit in accordance with an embodiment of the present disclosure may include: a command set conversion section configured to determine a selection value on the basis of sector information, and to consecutively output a fixed value unrelated to the sector information and the selection value as column address information in response to a conversion signal; and a column address output section configured to output the fixed value as a lower portion of a column address and output the selection value as an upper portion of the column address in response to the column address information.

A column address generation circuit in accordance with an embodiment of the present disclosure may include: a control signal output section configured to output, when a command set includes a random data output command, a conversion signal in an enabled state, and to output sector information included in the command set during a selection period; and a command set conversion section configured to output a lower portion of a column address during a period before the selection period in response to the conversion signal in the enabled state and the sector information, and to output an upper portion of the column address corresponding to the sector information during the selection period.

DETAILED DESCRIPTION

Hereinafter, embodiments of the present disclosure will be described in detail with reference to the drawings.

Figure 1:
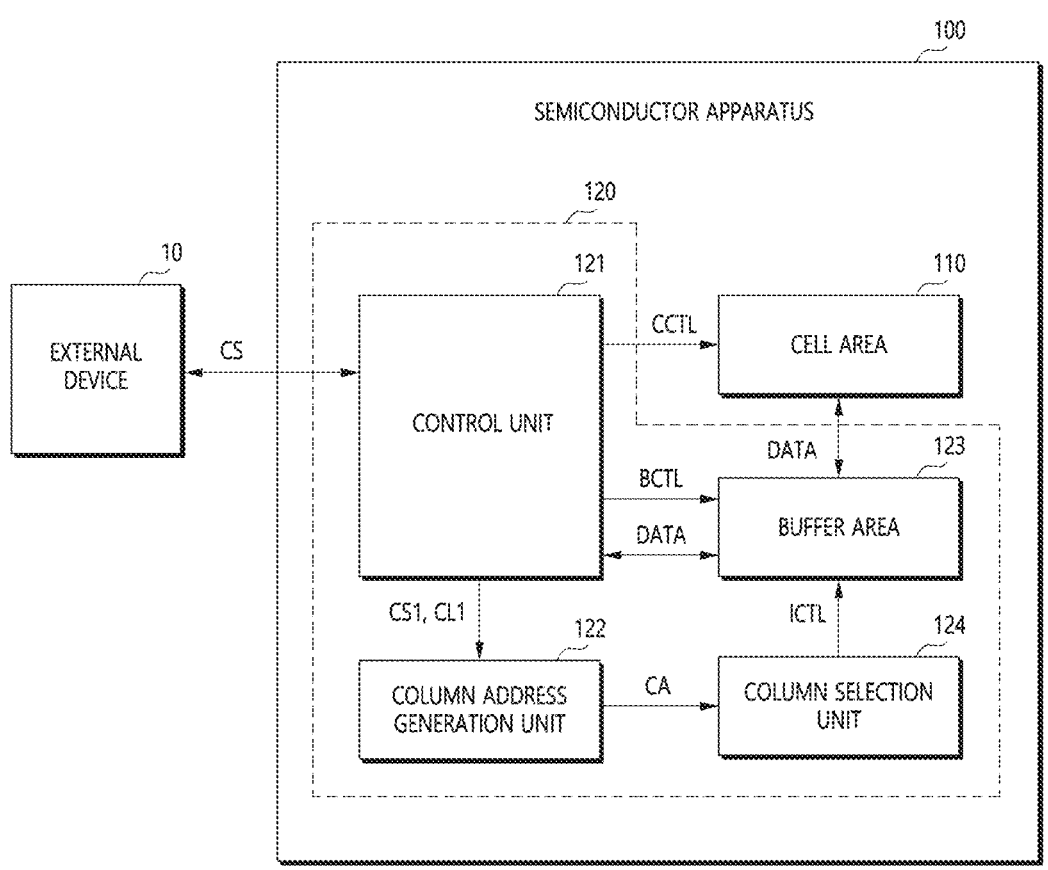
FIG. 1 is a block diagram illustrating a semiconductor apparatus in accordance with an embodiment of the present disclosure.

FIG. 1 is a block diagram illustrating a semiconductor apparatus 100 in accordance with an embodiment of the present disclosure.

Referring to FIG. 1, the semiconductor apparatus 100 may operate under the control of an external device 10. The semiconductor apparatus 100 may exchange signals CS with the external device 10. The signals CS may include, for example, a command latch enable signal, an address latch enable signal, an external clock signal, an external command set, and data DATA. The semiconductor apparatus 100 may perform various internal operations, for example, a program operation, a read operation, a full data output operation, and a random data output operation, in response to the signals CS transmitted from the external device 10. In relation to the random data output operation, the semiconductor apparatus 100, in an embodiment, may support the external command set that is transmitted from the external device 10 in a shorter time than before. Accordingly, in an embodiment, the semiconductor apparatus 100 may perform the random data output operation very efficiently.

In an embodiment, the semiconductor apparatus 100 may be a semiconductor memory apparatus. The semiconductor memory apparatus may include various types of memories such as a NAND flash memory, a three-dimensional NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The semiconductor apparatus 100 may include a cell area 110 and a peripheral area 120.

The cell area 110 may include a plurality of memory cells that store the data DATA. The specific configuration of the cell area 110 will be described with reference to FIG. 2.

The peripheral area 120 may perform an internal operation on the cell area 110 in response to the signals CS transmitted from the external device 10. The peripheral area 120 may store the data DATA in the cell area 110 and read the data DATA from the cell area 110 in response to the signals CS.

Specifically, the peripheral area 120 may include a control unit 121, a column address generation unit 122, a buffer area 123, and a column selection unit 124. Each of the control unit 121, the column address generation unit 122, the buffer area 123, and the column selection unit 124 may be configured by hardware, software, firmware, or a combination thereof. In an embodiment, the control unit 121, the column address generation unit 122, the buffer area 123, and the column selection unit 124 may each be configured by a circuit. In an embodiment, the column address generation unit 122 may be implemented by a circuit and be referred to as a column address generation circuit. In an embodiment, referring to FIG. 6, the column address information output part 222 may be implemented by a multiplexer. In an embodiment, referring to FIG. 6, the second command set output part 223 may be implemented by a multiplexer.

The control unit 121 may control overall operations of the semiconductor apparatus 100 on the basis of the signals CS received from the external device 10. For example, the control unit 121 may generate cell area control signals CCTL in response to the signals CS, and control the cell area 110 through the cell area control signals CCTL. The cell area control signals CCTL may include various levels of operating voltages (for example, a program voltage, a read voltage, an erase voltage, a verification voltage, and the like) required in, for example, a program operation, a read operation, and an erase operation.

The control unit 121 may also transmit the data DATA received from the external device 10 to the buffer area 123, and output the data DATA received from the buffer area 123 to the external device 10. The control unit 121 may generate buffer area control signals BCTL in response to the signals CS, and control the buffer area 123 through the buffer area control signals BCTL.

On the basis of the external command set synchronized with the external clock signal included in the signals CS, the control unit 121 may output a first command set CS1 synchronized with a first clock signal CL1 to the column address generation unit 122. The first clock signal CL1 may be the same as the external clock signal or may be a clock signal delayed from the external clock signal. The control unit 121 may receive the external command set in response to the external clock signal and output the received external command set as the first command set CS1.

Although not illustrated, the control unit 121 may include an interface configured to communicate with the external device 10 and a voltage generation circuit configured to generate various levels of operating voltages.

The column address generation unit 122 may output a column address CA to the column selection unit 124 in response to the first command set CS1 synchronized with the first clock signal CL1. When the first command set CS1 Includes a random data output command, the column address generation unit 122 may output the column address CA by performing a column address conversion operation. The column address conversion operation may be an operation for generating a column address CA for performing the random data output operation on the basis of sector information received from the external device 10 even though no column address CA is received from the external device 10.

Specifically, the column address CA for performing the random data output operation may include a fixed value unrelated to the sector information received from the external device 10. The column address generation unit 122 may determine a selection value on the basis of sector information included in the first command set CS1. The selection value might not be a fixed value unrelated to the sector information, but may be a variable value depending on the sector information received from the external device 10. Accordingly, the column address generation unit 122 may generate column address information including the fixed value and the selection value, and output the column address CA on the basis of the column address information.

When the first command set CS1 Includes a predetermined command other than the random data output command, the column address generation unit 122 may output the column address CA included in the first command set CS1 without performing the column address conversion operation. The word "predetermined" as used herein with respect to a parameter, such as a predetermined command, predetermined column address cycle, predetermined value, or predetermined operation, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

The buffer area 123 may exchange the data DATA between the cell area 110 and the control unit 121. The buffer area 123 may store the data DATA to be stored in the cell area 110 until the data DATA is stored in the cell area 110. The buffer area 123 may store the data DATA read from the cell area 110 until the data DATA is output to the control unit 121.

The column selection unit 124 may control the data DATA to be input to a position corresponding to the column address CA in the buffer area 123 or the data DATA to be output from the position corresponding to the column address CA. The column selection unit 124 may generate a column control signal ICTL on the basis of the column address CA and control the buffer area 123 through the column control signal ICTL.

In accordance with an embodiment the present disclosure, the sector information received from the external device 10 may include a much smaller number of bits than a column address for performing the random data output operation, and transmitting the sector information may require only a smaller number of clock cycles than the column address. Accordingly, in an embodiment, the time for transmitting the external command set for the random data output operation from the external device 10 to the semiconductor apparatus 100 may be effectively shortened. In an embodiment, because only the sector information is decoded while using the fixed value, the column address conversion operation may be efficiently simplified.

Figure 2:
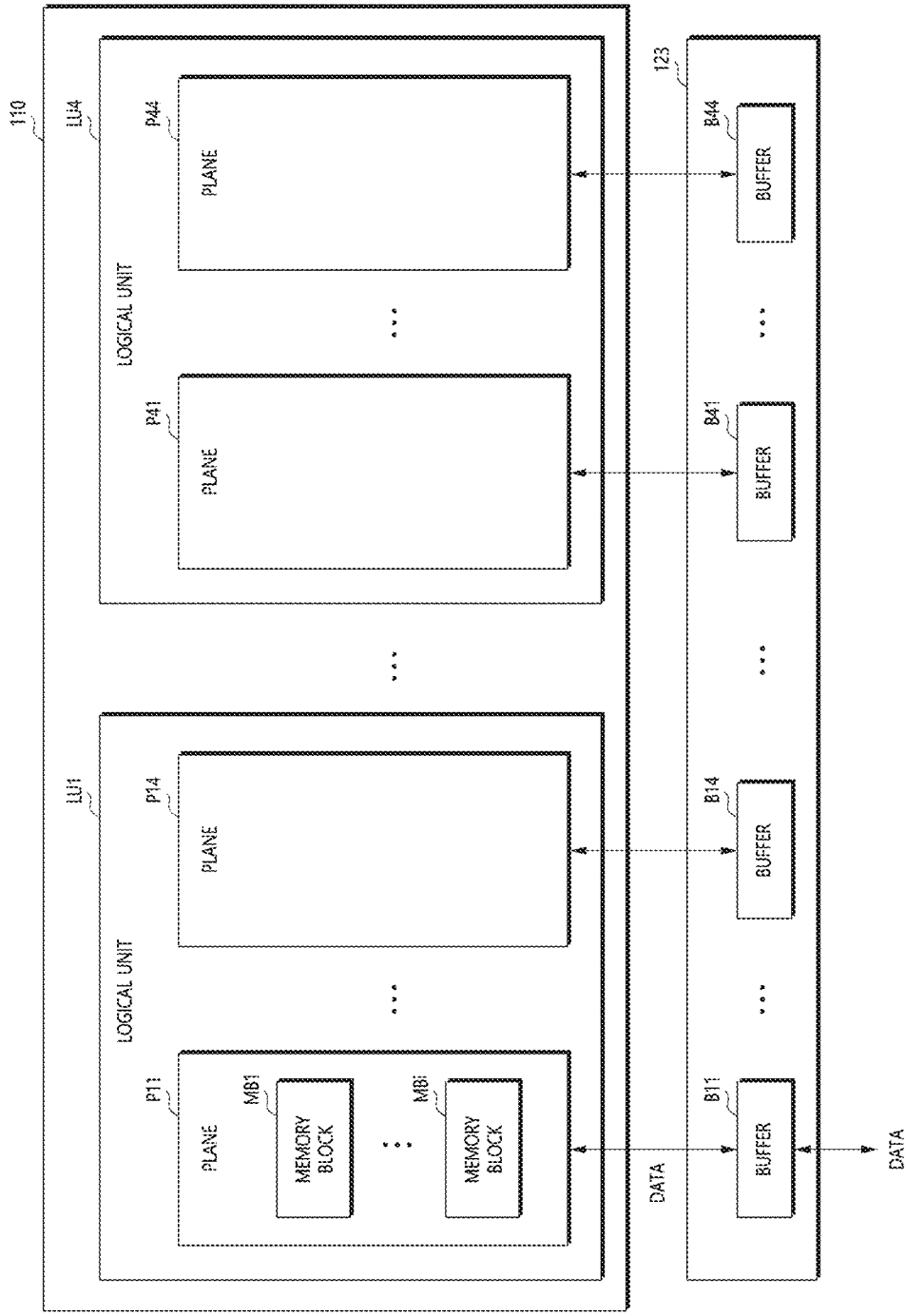
FIG. 2 is a block diagram illustrating a cell area and a buffer area in FIG. 1 in accordance with an embodiment of the present disclosure.

FIG. 2 is a block diagram illustrating the cell area 110 and the buffer area 123 in FIG. 1 in accordance with an embodiment of the present disclosure. The number of respective components in FIG. 2 is an example.

Referring to FIG. 2, the cell area 110 may include logical units LU1 to LU4. Depending on the embodiment, each logical unit may be a semiconductor memory chip or a semiconductor memory die. Each of the logical units LU1 to LU4 may be identified by a corresponding logical unit address.

The logical units LU1 to LU4 may be configured similarly. As an example, when the logical unit LU1 is described, the logical unit LU1 may include planes P11 to P14. The plane may be a set of memory blocks connected in common to a single buffer. The planes P11 to P14 may be connected to buffers B11 to B14, respectively. The planes P11 to P14 are used as an example. When the plane P11 is described, the plane P11 may include memory blocks MB1 to MBi connected in common to the buffer B11. The memory block may be a memory unit by which an erase operation is performed.

The buffer area 123 may include the buffers B11 to B44 respectively connected to the planes P11 to P44 included in the cell area 110. The buffers B11 to B44 may be configured and operate similarly. When the buffer B11 is described as an example, data DATA to be programmed to the plane P11 through a program operation may be stored in the buffer B11 before being written. The data DATA read from the plane P11 through a read operation may be stored in the buffer B11 before being output to the external device 10.

Figure 3:
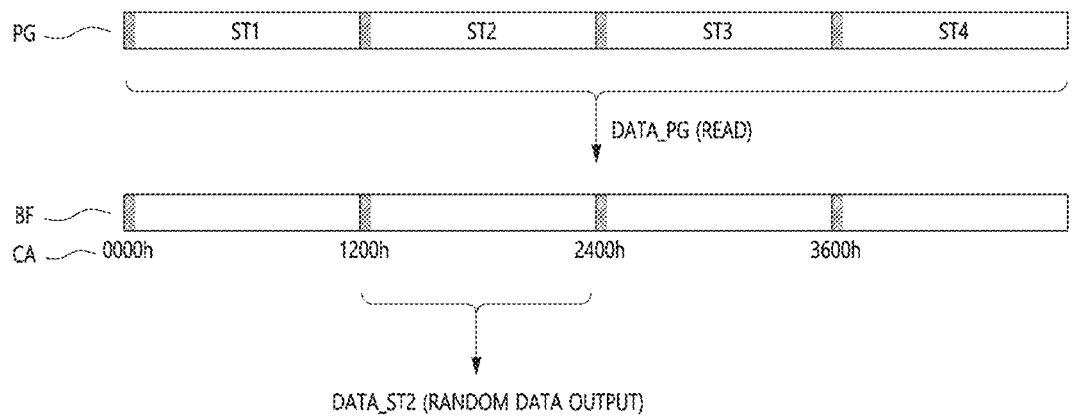
FIG. 3 is a diagram for explaining a read operation and a random data output operation of the semiconductor apparatus in FIG. 1 in accordance with an embodiment of the present disclosure.

FIG. 3 is a diagram for explaining a read operation and a random data output operation of the semiconductor apparatus 100 in FIG. 1 in accordance with an embodiment of the present disclosure.

Referring to FIG. 3, a page PG is a memory unit included in the cell area 110 and may be a unit by which the semiconductor apparatus 100 performs a program operation or a read operation. The page PG may be a unit by which the semiconductor apparatus 100 moves data between the cell area 110 and a buffer BF (i.e., one of the buffers B11 to B44). The semiconductor apparatus 100 may perform a read operation in order to read data DATA_PG from the page PG to the buffer BF connected to the page PG. The semiconductor apparatus 100 may perform a read operation in response to a read command received from the external device 10.

The page PG may include a first sector ST1 to a fourth sector ST4. For example, when the capacity of a single page PG is 18 KB and the first sector ST1 to the fourth sector ST4 have the same capacity, the capacity of each of the first sector ST1 to the fourth sector ST4 may be 4.5 KB. When data is processed in units of 4 KB outside of the semiconductor apparatus 100, each sector may store 4 KB of data and 0.5 KB or less of additional data for the 4 KB of data (for example, error correction data for the 4 KB of data).

After performing a read operation, the semiconductor apparatus 100 may output all or part of the data DATA_PG stored in the buffer BF to the external device 10 under the control of the external device 10. The full data output operation may be an operation for outputting 18 KB of total data DATA_PG from the buffer BF to the external device 10 under the control of the external device 10. The semiconductor apparatus 100 may perform the full data output operation in response to a full data output command received from the external device 10. A random data output operation may be an operation for outputting only data of a selected sector among the first sector ST1 to the fourth sector ST4 from the buffer BF to the external device 10 under the control of the external device 10. That is, the sector may be a memory unit by which the semiconductor apparatus 100 performs the random data output operation. The semiconductor apparatus 100 may perform the random data output operation in response to a random data output command received from the external device 10. For example, the semiconductor apparatus 100 may output only data DATA_ST2 of the second sector ST2 from the buffer BF to the external device 10 in response to the random data output command.

On the other hand, each bit of 18 KB stored in the page PG may correspond to a column address CA that increases by 1 from 0. In this case, the column address CA may be expressed as a 4-digit hexadecimal number (15 digits in binary) so that each bit of 18 KB may be designated. The first bits (in other words, start bits) (indicated by shading) of data stored in each of the first sector ST1 to the fourth sector ST4 may correspond to column addresses (CA) 0000h, 1200h, 2400h, and 3600h, respectively. The mark h after the number means hexadecimal. The column addresses (CA) 0000h, 1200h, 2400h, and 3600h may be referred to as start column addresses of the first sector ST1 to the fourth sector ST4. Depending on the embodiment, the start column address CA corresponding to each sector may be determined differently than described above according to the capacity of the page PG, the number of sectors constituting the page PG, and the capacity of each sector.

The external device may put sector information Indicating a sector for performing the random data output operation from the buffer BF into an external command set for the random data output operation. The semiconductor apparatus 100 may generate a column address CA for performing the random data output operation on the basis of the sector information, and perform the random data output operation on a sector corresponding to the generated column address CA. The column address CA for performing the random data output operation may mean a start column address CA of the sector for performing the random data output operation. The column address CA for performing the random data output operation may be generated as any one of the start column addresses of the first sector ST1 to the fourth sector ST4. For example, when the column address CA for performing the random data output operation is determined to be 1200h, the semiconductor apparatus 100 may output only the data DATA_ST2 of the second sector ST2 from the buffer BF to the external device 10.

Figure 4:
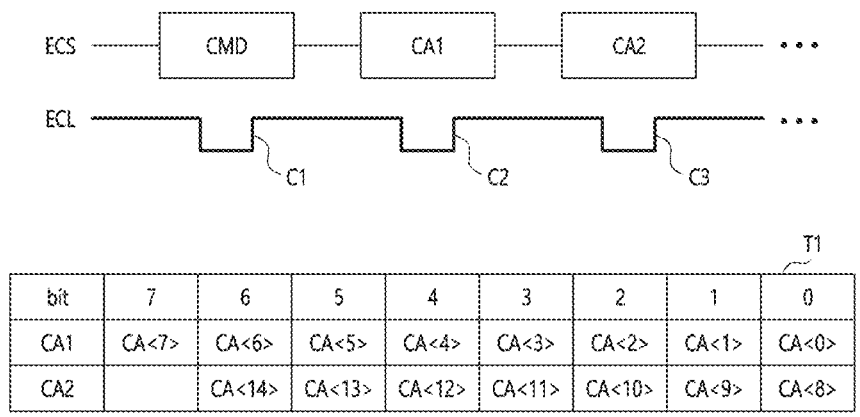
FIG. 4 is a diagram for explaining an external command set for a normal operation in accordance with an embodiment of the present disclosure.

FIG. 4 is a diagram for explaining an external command set for a normal operation in accordance with an embodiment of the present disclosure.

Referring to FIG. 4, the normal operation might not be a random data output operation, but may be a predetermined operation of the semiconductor apparatus 100 that requires no column address conversion operation in accordance with an embodiment of the present disclosure. An external command set ECS for the normal operation may include a column address CA for performing the normal operation. For example, the normal operation may be a read operation, a program operation, a full data output operation, or the like.

Specifically, the external command set ECS for the normal operation may include a command CMD for the normal operation, a first column address CA1, a second column address CA2, and the like. The external command set ECS may be transmitted from the external device 10 to the semiconductor apparatus 100 by being synchronized with an external clock signal ECL. Each cycle of the external clock signal ECL may be defined under the control of the external device 10. For example, although not illustrated, the semiconductor apparatus 100 may further receive a command latch enable signal defining a command cycle and an address latch enable signal defining an address cycle from the external device 10.

For example, a first cycle C1 of the external clock signal ECL may be a command cycle, a second cycle C2 may be a first address cycle, and a third cycle C3 may be a second address cycle. The semiconductor apparatus 100 may recognize, as a command CMD, information received in the first cycle C1 of the external clock signal ECL, and determine details of a normal operation to be performed through the command CMD. When the command CMD is a command for the normal operation, the semiconductor apparatus 100 may recognize, as a column address CA, information received in the second cycle C2 and the third cycle C3 of the external clock signal ECL.

The semiconductor apparatus 100 may generate an internal command set synchronized with an internal clock signal on the basis of the external command set ECS synchronized with the external clock signal ECL. When the column address CA included in the external command set ECS is synchronized with the second cycle C2 and the third cycle C3 of the external clock signal ECL, a column address included in the internal command set may also be synchronized with a second cycle and a third cycle of the internal clock signal. Accordingly, the second cycles and the third cycles of the external clock signal ECL and the internal clock signal may be hereinafter defined as column address cycles. Depending on the embodiment, the column address cycles may vary depending on cycles of the external clock signal ECL with which the column address CA included in the external command set ECS is synchronized.

As described above, when the capacity of the page PG is 18 KB, the column address CA may be expressed in 15 bits. Accordingly, as shown in Table T1, the first column address CA1 may include a lower portion (that is, CA<7:0>) of the column address CA for performing the internal operation of the semiconductor apparatus 100. The lower portion of the column address CA may mean lower 8 bits close to LSB among the 15 bits constituting the column address CA. The second column address CA2 may include an upper portion (that is, CA<14:8>) of the column address CA. The upper portion of the column address CA may mean upper 7 bits close to MSB among the 15 bits constituting the column address CA.

The semiconductor apparatus 100 may further receive a logical unit address, a plane address, a block address, a page address, and the like for performing the internal operation from the external device 10 during an additional cycle of the external clock signal ECL. In an embodiment, when an example determined by the specifications of the semiconductor apparatus 100 is described, the semiconductor apparatus 100 may receive all addresses, including the column address CA, during a total of 5 cycles.

Figure 5:
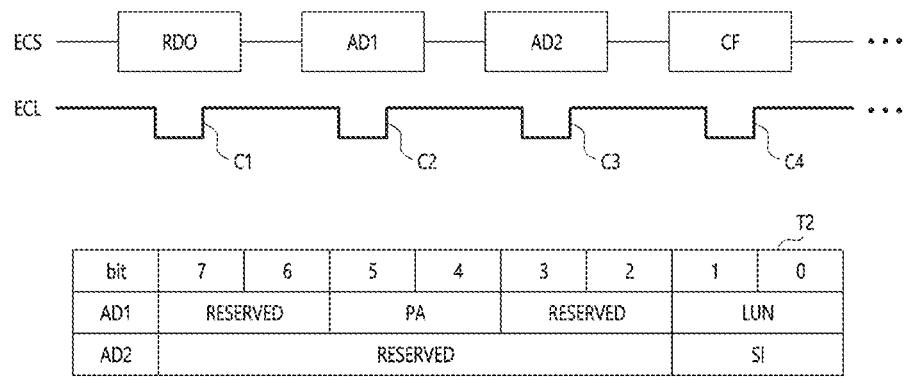
FIG. 5 is a diagram for explaining an external command set for the random data output operation in accordance with an embodiment of the present disclosure.

FIG. 5 is a diagram for explaining the external command set ECS for the random data output operation in accordance with an embodiment of the present disclosure.

Referring to FIG. 5, the external command set ECS for the random data output operation transmitted from the external device 10 may include a random data output command RDO, a first address AD1, a second address AD2, and a confirmation command CF. The semiconductor apparatus 100 may receive the external command set ECS for the random data output operation during 4 cycles of the external clock signal ECL. The semiconductor apparatus 100 may recognize the random data output command RDO in response to a command cycle, that is, a first cycle C1, of the external clock signal ECL, and recognize the confirmation command CF in response to a confirmation command cycle, that is, a fourth cycle C4, of the external clock signal ECL, thereby determining to perform the random data output operation.

Referring to a table T2, 2 bits (for example, bit 0 and bit 1) included in the first address AD1 may include a logical unit address LUN corresponding to a logical unit for performing the random data output operation, and the other 2 bits (for example, bit 4 and bit 5) may include a plane address PA corresponding to a plane for performing the random data output operation. The term 'RESERVED' may signify that corresponding bits are set aside for potential use. The semiconductor apparatus 100 may recognize the first address AD1 in response to the second cycle C2 of the external clock signal ECL and determine a logical unit and a plane for performing the random data output operation.

Furthermore, 2 bits (for example, bit 0 and bit 1) included in the second address AD2 may include sector information SI indicating a sector for performing the random data output operation. For example, when a single page PG includes a first sector ST1 to a fourth sector ST4, the first sector ST1 to the fourth sector ST4 may correspond to sector indexes from 00b to 11b, respectively, and the sector information SI may include a sector index corresponding to a sector for performing the random data output operation. The mark b after the number means a binary number. For example, when the external device 10 intends to receive only data of the third sector ST3 from the semiconductor apparatus 100 through the random data output operation, the external device 10 may transmit an external command set ECS for the random data output operation to the semiconductor apparatus 100, the external command set ECS including a sector index 10b corresponding to the third sector ST3. The semiconductor apparatus 100 may recognize sector information SI of the second address AD2 in response to a third cycle C3 of the external clock signal ECL, and determine a sector for performing the random data output operation on the basis of the sector information SI.

Depending on the embodiment, apart from FIG. 5, the first address AD1 may include the sector information SI, and the second address AD2 may include the logical unit address LUN and the plane address PA.

In this way, in an embodiment, the external command set ECS for the random data output operation may be transmitted very quickly because the external command set ECS includes the first address AD1 and the second address AD2 transmitted during only 2 cycles. In an embodiment, even though the semiconductor apparatus 100 does not receive a total of 15 bits of column address CA for performing the random data output operation during the column address cycles C2 and C3 from the external device 10, but receives only sector information SI including a smaller number of bits that the column address, the semiconductor apparatus 100 may efficiently determine the 15-bit column address CA on the basis of the sector information SI. Specifically, starting column addresses of sectors constituting the page PG may include lower portions having the same value, and thus the semiconductor apparatus 100 may determine the lower portion of the column address CA for performing the random data output operation as a fixed value regardless of the value of the sector information SI. For example, because the start column addresses 0000h, 1200h, 2400h, and 3600h of the first sector ST1 to the fourth sector ST4 include lower portions having the same value (that is, 00h), the semiconductor apparatus 100 may generate the lower portion of the column address CA for performing the random data output operation as 00h regardless of the value of the sector information SI. By decoding the sector information SI, the semiconductor apparatus 100 may determine the upper portion of the column address CA for performing the random data output operation as any one of 00h, 12 h, 24h, and 36h. In an embodiment, because only the sector information SI is decoded while using the fixed value 00h, the column address conversion operation may be efficiently simplified.

Figure 6:
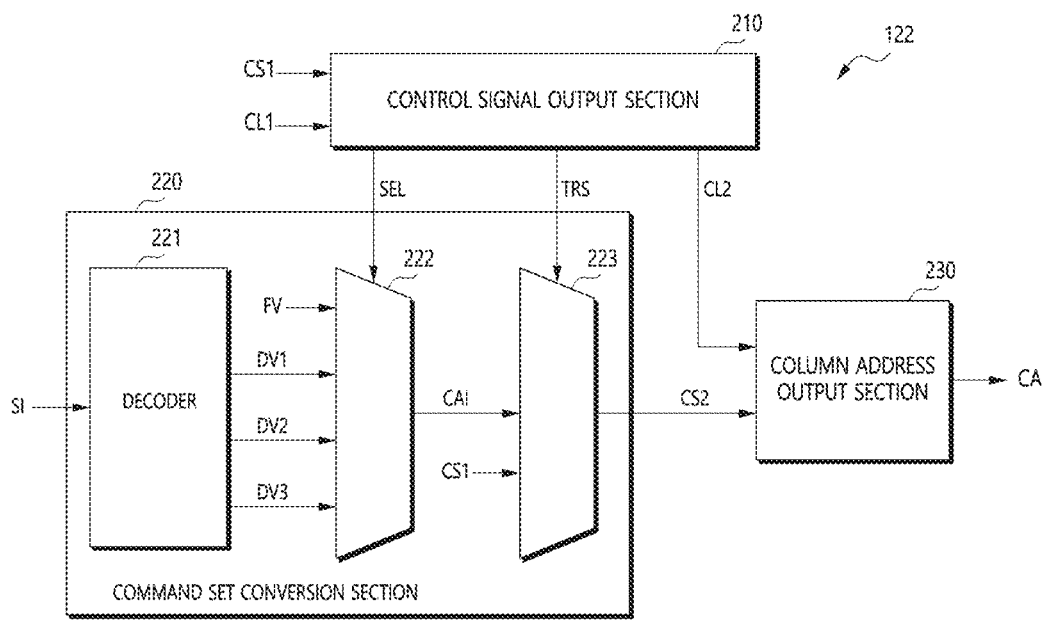
FIG. 6 is a block diagram illustrating a column address generation unit in FIG. 1 in accordance with an embodiment of the present disclosure.

FIG. 6 is a block diagram illustrating the column address generation unit 122 in FIG. 1 in accordance with an embodiment of the present disclosure.

Referring to FIG. 6, when the first command set CS1 includes the random data output command, the column address generation unit 122 may output the column address CA by performing the column address conversion operation on the basis of the sector information SI. When the first command set CS1 includes a predetermined command other than the random data output command, the column address generation unit 122 may output the column address CA included in the first command set CS1.

The column address generation unit 122 may include a control signal output section 210, a command set conversion section 220, and a column address output section 230. In an embodiment, the control signal output section 210, the command set conversion section 220, and the column address output section 230 may each be configured by a circuit.

The control signal output section 210 may receive the first command set CS1 synchronized with the first clock signal CL1, and output a conversion signal TRS, a selection signal SEL, and a second clock signal CL2. The control signal output section 210 may identify the type of command included in the first command set CS1 in response to the command cycle of the first clock signal CL1. When the first command set CS1 includes the random data output command RDO, the control signal output section 210 may control the command set conversion section 220 to perform the column address conversion operation through the conversion signal TRS and the selection signal SEL.

Specifically, when the first command set CS1 includes the random data output command RDO, the control signal output section 210 may output the conversion signal TRS in an enabled state during the column address cycles of the first clock signal CL1. As described above, the column address cycles of the first clock signal CL1 during which the conversion signal TRS is output in the enabled state may be the second cycle and the third cycle of the first clock signal CL1. In an embodiment, this may be to simplify a hardware structure by generating a column address in the same cycles even in a random data output operation because the column address is generated in response to the second cycle and the third cycle of the first clock signal CL1 when the first command set CS1 includes the column address in a normal operation.

The conversion signal TRS may also change from a disabled state to an enabled state before a selection period to be described below starts. After the selection period starts, the conversion signal TRS may change from the enabled state to the disabled state. The disabled state may be a first state of the conversion signal TRS, and the enabled state may be a second state of the conversion signal TRS. For example, the conversion signal TRS may be output at a logic high level in the disabled state and may be output at a logic low level in the enabled state.

More specifically, the control signal output section 210 may output the conversion signal TRS that changes from the disabled state to the enabled state, in response to the command cycle, that is, the first cycle, of the first clock signal CL1. For example, the control signal output section 210 may output the conversion signal TRS that changes from the disabled state to the enabled state in response to a first rising edge or a first falling edge of the first clock signal CL1.

After outputting the conversion signal TRS in the enabled state, the control signal output section 210 may output the conversion signal TRS that changes from the enabled state to the disabled state, in response to the confirmation command cycle, that is, the fourth cycle, of the first clock signal CL1. For example, the control signal output section 210 may output the conversion signal TRS that changes from the enabled state to the disabled state in response to a fourth rising edge or a fourth falling edge of the first clock signal CL1.

When the first command set CS1 includes a predetermined command other than the random data output command RDO, the control signal output section 210 may maintain the conversion signal TRS in the disabled state. That is, when the first command set CS1 includes a predetermined command requiring no column address conversion operation of the command set conversion section 220, the control signal output section 210 may maintain the conversion signal TRS in the disabled state.

When the first command set CS1 includes the random data output command RDO, the control signal output section 210 may output sector information SI included in the first command set CS1, that is, the selection signal SEL including a sector index. For example, the control signal output section 210 may output the sector index as the selection signal SEL as is. The control signal output section 210 may identify (i.e., sample) the sector information SI included in the first command set CS1 in response to a predetermined column address cycle of the first clock signal CL1. According to the example described with reference to FIG. 5, the control signal output section 210 may identify the sector information SI included in the first command set CS1 in response to the third cycle of the first clock signal CL1, and output a 2-bit sector information SI as the selection signal SEL. Depending on the embodiment, the number of bits constituting the selection signal SEL may vary depending on the number of sectors constituting the page PG, the number of bits constituting the sector information SI, and the number of values input to a column address information output part 222.

The control signal output section 210 may output the sector information SI as the selection signal SEL during the selection period. The selection period may start after the control signal output section 210 receives the sector information SI. For example, the selection period may start after the control signal output section 210 recognizes the sector information SI included in the first command set CS1 in response to the third cycle of the first clock signal CL1. Depending on the embodiment, the selection period may start from the third cycle after the control signal output section 210 recognizes the sector information SI included in the first command set CS1 in response to the second cycle of the first clock signal CL1. The selection period may end after the conversion signal TRS changes from the enabled state to the disabled state.

The control signal output section 210 may output a predetermined value as the selection signal SEL during a period other than the selection period. For example, the predetermined value may be a reset value consisting of 0.

When the first command set CS1 includes a predetermined command other than the random data output command RDO, the control signal output section 210 may maintain the selection signal SEL as the predetermined value. That is, when the first command set CS1 includes a predetermined command requiring no column address conversion operation of the command set conversion section 220, the control signal output section 210 may maintain the selection signal SEL as the predetermined value.

The control signal output section 210 may control the column address output section 230 to output the column address CA through the second clock signal CL2. The control signal output section 210 may output the second clock signal CL2 on the basis of the first clock signal CL1. The second clock signal CL2 may be the same as the first clock signal CL1 or may be a clock signal delayed from the first clock signal CL1.

The command set conversion section 220 may perform the column address conversion operation in response to the selection signal SEL and the conversion signal TRS. Specifically, the command set conversion section 220 may generate column address information CAI on the basis of the selection signal SEL and the sector information SI included in the first command set CS1. Subsequently, the command set conversion section 220 may output a second command set CS2 from the first command set CS1 by replacing information on the column address cycles of the first clock signal CL1 with the column address information CAI on the basis of the conversion signal TRS. As described above, the column address information CAI may include a fixed value FV to be used as a lower portion of the column address CA for performing the random data output operation. The fixed value FV may be a value of the same lower portions of start column addresses of sectors constituting the page PG.

Specifically, the command set conversion section 220 may include a decoder 221, the column address information output part 222, and a second command set output part 223. In an embodiment, the decoder 221, the column address information output part 222, and the second command set output part 223 may each be configured by a circuit. In an embodiment, the column address information output part 222 may be implemented by a multiplexer. In an embodiment, the second command set output part 223 may be implemented by a multiplexer.

The decoder 221 may receive the sector information SI included in the first command set CS1, and output any one of decoded values DV1 to DV3 on the basis of the sector information SI. The decoded values DV1 to DV3 may be the remaining values excluding the same value as the fixed value FV among upper portions of the start column addresses of the sectors constituting the page PG. That is, the same value as the fixed value FV among the upper portions of the start column addresses of the sectors constituting the page PG might not be output from the decoder 221 because the fixed value FV may be used as is.

Specifically, the decoder 221 may output no decoded value when a start column address of a sector corresponding to the sector information SI has the same upper portion as the fixed value FV. In other words, the decoder 221 may ignore a sector information SI of a specific value. In response to the sector information SI other than a specific value that is ignored, the decoder 221 may output a decoded value corresponding to an upper portion of a start column address of a corresponding sector. According to the example described with reference to FIGS. 3 and 5, the decoded values DV1 to DV3 may be 12 h, 24h, and 36h that are the upper portions of the start column addresses of the second sector ST2 to the fourth sector ST4, respectively. The decoder 221 might not output anything when the sector information SI is 00b, may output 12h when the sector information SI is 01b, may output 24h when the sector information SI is 10b, and may output 36h when the sector information SI is 11b.

The column address information output part 222 may output any one of the fixed value FV and the decoded values DV1 to DV3 as the column address information CAI in response to the selection signal SEL. Specifically, the column address information output part 222 may output the fixed value FV in response to the selection signal SEL having a predetermined value during a period other than the selection period. Subsequently, the column address information output part 222 may output a selection value in response to the selection signal SEL including the sector information SI during the selection period. The selection value is a value selected by the sector information SI and may be one of the decoded values DV1 to DV3 and the fixed value FV. As a result, the column address information output part 222 may consecutively output the lower portion (that is, the fixed value FV) and the upper portion (that is, the selection value) of the column address CA for performing the random data output operation as the column address information CAI on the basis of the selection signal SEL.

The second command set output part 223 may output the second command set CS2 by replacing information of the column address cycles included in the first command set CS1 with the column address information CAI on the basis of the conversion signal TRS. Specifically, the second command set output part 223 may output the information included in the first command set CS1 as is to be included in the second command set CS2 in response to the conversion signal TRS in the disabled state. Subsequently, the second command set output part 223 may output the column address information CAI to be included in the second command set CS2 in response to the conversion signal TRS in the enabled state. As described above, the conversion signal TRS is output in the enabled state in the column address cycles of the first clock signal CL1, and as a result, the second command set CS2 may consecutively include the fixed value FV and the selection value in the column address cycles of the first clock signal CL1.

On the other hand, when the first command set CS1 includes a predetermined command other than the random data output command RDO and the conversion signal TRS is maintained in the disabled state, the second command set output part 223 may output the first command set CS1 as the second command set CS2 as is. Accordingly, the column address CA included in the first command set CS1 may be included in the second command set CS2 as is.

The column address output section 230 may output the column address CA in the column address cycles of the second clock signal CL2 on the basis of the second command set CS2. For example, the column address output section 230 may output a value sampled in the second command set CS2 as the lower portion of the column address CA in response to the first column address cycle, that is, the second cycle, of the second clock signal CL2. Subsequently, the column address output section 230 may output a value sampled in the second command set CS2 as the upper portion of the column address CA in response to the second column address cycle, that is, the third cycle, of the second clock signal CL2. The column address output section 230 may output the lower portion of the column address CA and the upper portion of the column address CA in parallel. In summary, the column address output section 230 may output the column address CA regardless of whether the second command set CS2 is related to a random data output operation or not.

Figure 7:
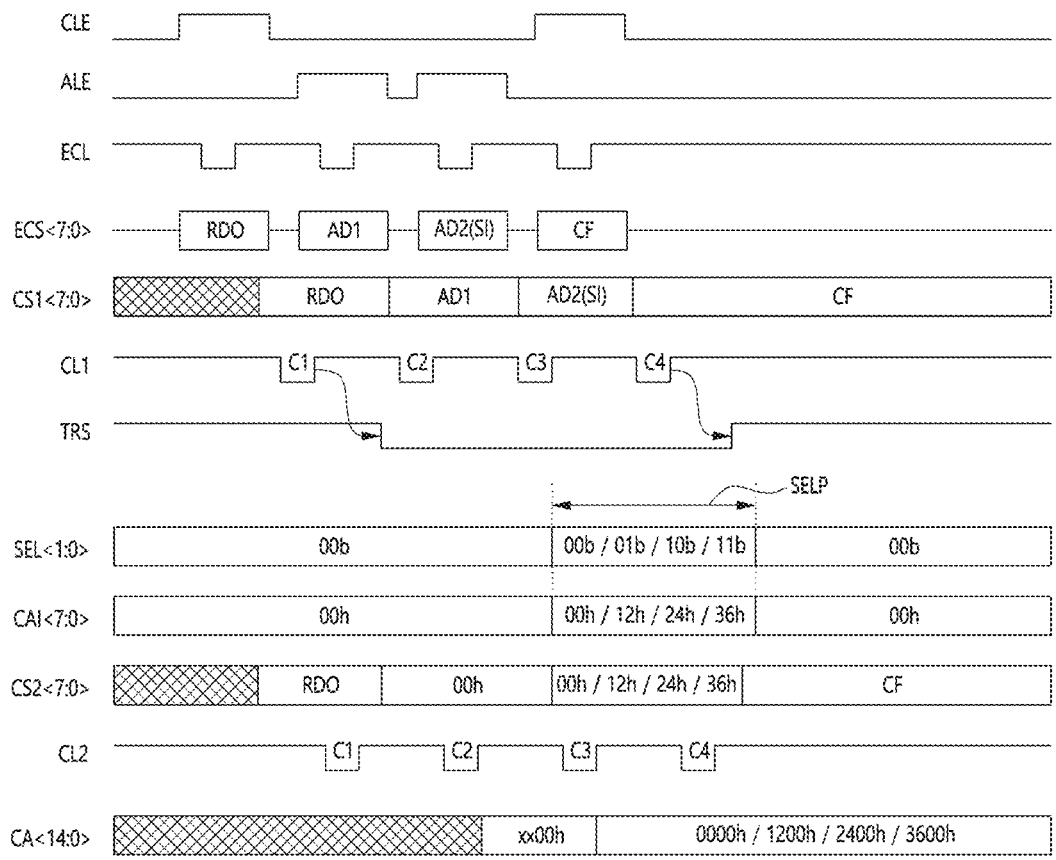
FIG. 7 is a timing diagram of signals for explaining the random data output operation of the semiconductor apparatus in FIG. 1 in accordance with an embodiment of the present disclosure.

FIG. 7 is a timing diagram of signals for explaining the random data output operation of the semiconductor apparatus 100 in FIG. 1 in accordance with an embodiment of the present disclosure. The embodiment according to FIG. 7 may follow the examples described with reference to FIGS. 3, 5, and 6.

Referring to FIG. 7, the control unit 121 may receive a command latch enable signal CLE, an address latch enable signal ALE, the external clock signal ECL, and the external command set ECS from the external device 10. The external command set ECS may consecutively include the random data output command RDO synchronized with the external clock signal ECL, the first address AD1, the second address AD2, and the confirmation command CF. The second address AD2 may include the sector information SI.

The control unit 121 may recognize the random data output command RDO and the confirmation command CF included in the external command set ECS in response to the command latch enable signal CLE and the external clock signal ECL. The control unit 121 may determine to perform the random data output operation on the basis of the random data output command RDO.

The control unit 121 may recognize the first address AD1 and the second address AD2 included in the external command set ECS in response to the address latch enable signal ALE and the external clock signal ECL. The control unit 121 may determine a logical unit and a plane for performing the random data output operation on the basis of the first address AD1. In other words, the control unit 121 may determine to perform the random data output operation on a buffer BF connected to a specific plane according to the first address AD1. The control unit 121 may also recognize the sector information SI on the basis of the second address AD2.

The control unit 121 may generate the first clock signal CL1 on the basis of the external clock signal ECL, and output the first command set CS1 in synchronization with the first clock signal CL1. The first command set CS1 may consecutively include the random data output command RDO, the first address AD1, the second address AD2, and the confirmation command CF, as in the external command set ECS.

The control signal output section 210 may receive the first command set CS1 and the first clock signal CL1. The control signal output section 210 may determine to perform the random data output operation in response to the random data output command RDO included in the first command set CS1, and output the conversion signal TRS and the selection signal SEL.

Specifically, the control signal output section 210 may output the conversion signal TRS that changes from a disabled state (that is, a logic high level) to an enabled state (that is, a logic low level) in response to the first rising edge of the first clock signal CL1. Subsequently, the control signal output section 210 may output the conversion signal TRS that changes from the enabled state to the disabled state in response to the fourth rising edge of the first clock signal CL1. The conversion signal TRS may change from the disabled state to the enabled state before a selection period SELP starts, and may change from the enabled state to the disabled state after a selection period SELP starts.

The control signal output section 210 may output the selection signal SEL on the basis of the sector information SI included in the first command set CS1. Specifically, the control signal output section 210 may output the reset value 00b as the selection signal SEL in a period before the selection period SELP. The control signal output section 210 may output the sector information SI as the selection signal SEL in the selection period SELP after the sector information SI is identified. The value of the selection signal SEL in the selection period SELP may be any one of 00b to 11b, which is the same as the sector information SI. The selection period SELP may end after the conversion signal TRS changes from the enabled state to the disabled state. The control signal output section 210 may output the reset value 00b as the selection signal SEL in the period after the selection period SELP.

The column address information output part 222 may output the fixed value (FV) 00h to be used as the lower portion of the column address CA as the column address information CAI in response to the selection signal SEL of the reset value 00b in the period before the selection period SELP. In response to the selection signal SEL including the sector information SI during the selection period SELP, the column address information output part 222 may output, as the column address information CAI, a selection value to be used as the upper portion of the column address CA, that is, any one of 00h, 12 h, 24h, or 36h. In response to the selection signal SEL of the reset value 00b in the period after the selection period SELP, the column address information output part 222 may output the fixed value (FV) 00h as the column address information CAI.

The second command set output part 223 may output information included in the first command set CS1 to be included in the second command set CS2 while the conversion signal TRS is in the disabled state, and output the column address information CAI to be included in the second command set CS2 while the conversion signal TRS is in the enabled state. Because the conversion signal TRS is in the enabled state during at least the column address cycles (that is, the second cycle C2 and the third cycle C3) of the first clock signal CL1, information on the column address cycles C2 and C3 of the first clock signal CL1 in the first command set CS1 may be replaced with the column address information CAI. Because the selection signal SEL changes from the reset value 00b to the sector information SI while the conversion signal TRS is in the enabled state, the column address information CAI of the second command set CS2 may consecutively include the fixed value FV and the selection value.

The column address output section 230 may output the fixed value (FV) 00h in the second command set CS2 as the lower portion of the column address CA in response to the second cycle C2 of the second clock signal CL2. The mark xx in the illustrated xx00h indicates that upper 7 bits of the column address CA are not yet determined. Subsequently, the column address output section 230 may output the selection value from the second command set CS2 to the upper portion of the column address CA in response to the third cycle C3 of the second clock signal CL2. For example, when the selection value is 12 h, the total column address CA may be output as 1200h.

Figure 8:
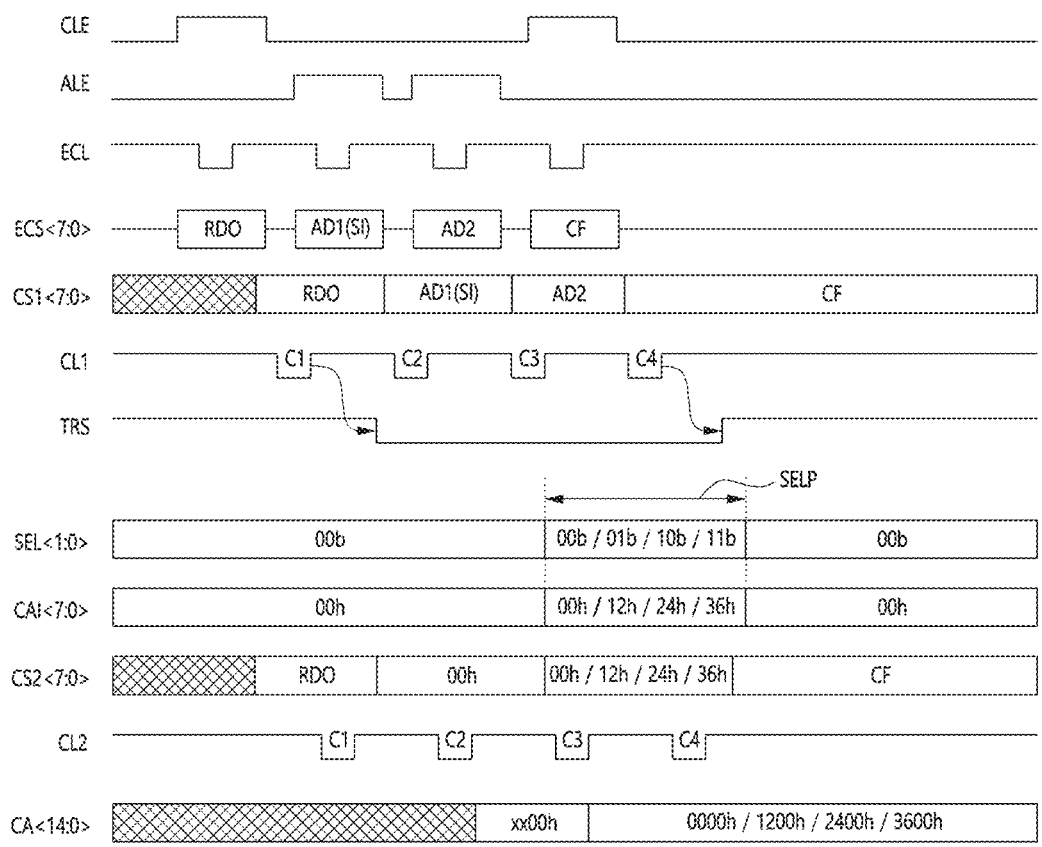
FIG. 8 is a timing diagram of signals for explaining the random data output operation of the semiconductor apparatus in FIG. 1 in accordance with an embodiment of the present disclosure.

FIG. 8 is a timing diagram of signals processed in the semiconductor apparatus 100 in accordance with an embodiment of the present disclosure.

Referring to FIG. 8, apart from FIG. 5, depending on the embodiment, the first address AD1 of the external command set ECS may include a 2-bit sector information SI and the second address AD2 may include the logical unit address LUN and the plane address PA.

The control signal output section 210 may identify the sector information SI included in the first command set CS1 in the second cycle C2 of the first clock signal CL1 according to a prearrangement with the external device 10. Subsequently, the control signal output section 210 may output the selection signal SEL including the sector information SI in response to the third cycle C3 of the first clock signal CL1. Because the remaining operations are the same as those described with reference to FIG. 7, detailed descriptions are omitted. In summary, the column address generation unit 122 may generate the column address CA even though the sector information SI is received at any clock address cycle of the first clock signal CL1.

In accordance with the embodiment, in spite of an operation other than a random data output operation, the column address generation unit 122 of the present disclosure may generate a column address CA similarly to the above as long as it is an operation of accessing only a selected sector of a page PG. Specifically, for a specific operation of accessing only the selected sector of the page PG, the external device 10 may provide sector information SI to the semiconductor apparatus 100 similarly to the above. Subsequently, the semiconductor apparatus 100 may generate a column address CA on the basis of sector information SI and access the selected sector, similar to the above.

The above description is merely intended to illustratively describe the technical spirit of the present disclosure, and various changes and modifications can be made by those skilled in the art to which the present disclosure pertains without departing from the essential features of the present disclosure. Furthermore, the embodiments disclosed in the present disclosure are not intended to limit the technical spirit of the present disclosure, but are intended to describe the present disclosure. The scope of the technical spirit of the present disclosure is not limited by these embodiments. The scope of the present disclosure should be interpreted by the accompanying claims and all technical spirits falling within the equivalent scope thereto should be interpreted as being included in the scope of the present disclosure.

What is claimed is:

1. A column address generation circuit comprising:
a command set conversion section configured to generate column address information on the basis of sector information included in a first command set synchronized with a first clock signal, and to output a second command set from the first command set by replacing information on column address cycles of the first clock signal with the column address information in response to a conversion signal; and
a column address output section configured to output a column address on the basis of the second command set.

2. The column address generation circuit according to claim 1, further comprising:
a control signal output section configured to output the conversion signal in response to a random data output command included in the first command set.

3. The column address generation circuit according to claim 2, wherein the control signal output section is configured to output the sector information as a selection signal during a selection period, and to output a predetermined value as the selection signal during a period other than the selection period.

4. The column address generation circuit according to claim 3, wherein the control signal output section is configured to identify the sector information Included in the first command set in response to a predetermined column address cycle of the first clock signal.

5. The column address generation circuit according to claim 3, wherein the control signal output section is configured to change the conversion signal from a disabled state to an enabled state before the selection period starts, and to change the conversion signal from the enabled state to the disabled state after the selection period starts.

6. The column address generation circuit according to claim 2, wherein the control signal output section is configured to change the conversion signal from a disabled state to an enabled state in response to a command cycle of the first clock signal, and to change the conversion signal from the enabled state to the disabled state in response to a confirmation command cycle of the first clock signal.

7. The column address generation circuit according to claim 2, wherein the control signal output section is configured to output the conversion signal in an enabled state during at least the column address cycles of the first clock signal.

8. The column address generation circuit according to claim 2, wherein the control signal output section is configured to maintain the conversion signal in a disabled state when the first command set includes a predetermined command, and
the command set conversion section is configured to output the first command set as the second command set without replacement with the column address information in response to the conversion signal in the disabled state.

9. The column address generation circuit according to claim 1, wherein the command set conversion section comprises:
a decoder configured to output decoded values on the basis of the sector information; and
a column address information output part configured to output any one of the decoded values and a fixed value as the column address information on the basis of a selection signal.

10. The column address generation circuit according to claim 9, wherein the column address information output part is configured to output any one selection value of the decoded values and the fixed value as the column address information during a selection period on the basis of the selection signal, and to output the fixed value as the column address information during a period other than the selection period.

11. The column address generation circuit according to claim 1, wherein the command set conversion section further comprises:
a second command set output part configured to output information included in the first command set to be included in the second command set in response to the conversion signal in a disabled state, and to output the column address information to be included in the second command set in response to the conversion signal in an enabled state.

12. The column address generation circuit according to claim 1, wherein the column address output section is configured to output a value sampled in the second command set as a lower portion of the column address in response to a first column address cycle of a second clock signal, and to output a value sampled in the second command set as an upper portion of the column address in response to a second column address cycle of the second clock signal.

13. A column address generation circuit comprising:
a command set conversion section configured to determine a selection value on the basis of sector information, and to consecutively output a fixed value unrelated to the sector information and the selection value as column address information in response to a conversion signal; and a column address output section configured to output the fixed value as a lower portion of a column address and output the selection value as an upper portion of the column address in response to the column address information.

14. The column address generation circuit according to claim 13, further comprising:
a control signal output section configured to output the conversion signal and to output the sector information included in a command set as a selection signal during a selection period, in response to a random data output command included in the command set.

15. The column address generation circuit according to claim 14, wherein the control signal output section is configured to receive the command set synchronized with a clock signal, and to identify the sector information included in the command set in response to a predetermined column address cycle of the clock signal.

16. The column address generation circuit according to claim 14, wherein the control signal output section is configured to change the conversion signal from a disabled state to an enabled state before the selection period starts.

17. The column address generation circuit according to claim 14, wherein the control signal output section is configured to receive the command set synchronized with a clock signal, and to change the conversion signal from a disabled state to an enabled state in response to a command cycle of the clock signal.

18. The column address generation circuit according to claim 14, wherein the control signal output section is configured to receive the command set synchronized with a clock signal, and to output the conversion signal in an enabled state during at least column address cycles of the clock signal.

19. The column address generation circuit according to claim 14, wherein the control signal output section is configured to output a predetermined value as the selection signal during a period before the selection period, and
the command set conversion section is configured to output the fixed value as the column address information in response to the selection signal having the predetermined value during the period before the selection period, and to output the selection value as the column address information in response to the selection signal of the sector information during the selection period.

20. A column address generation circuit comprising:
a control signal output section configured to output, when a command set includes a random data output command, a conversion signal in an enabled state, and to output sector information included in the command set during a selection period; and
a command set conversion section configured to output a lower portion of a column address during a period before the selection period and to output an upper portion of the column address corresponding to the sector information during the selection period, in response to the conversion signal in the enabled state and the sector information.

\* \* \* \* \*